May 13, 1930.                K. M. WISE                1,758,305
                         HEADLIGHT MOUNTING
                         Filed May 23, 1929
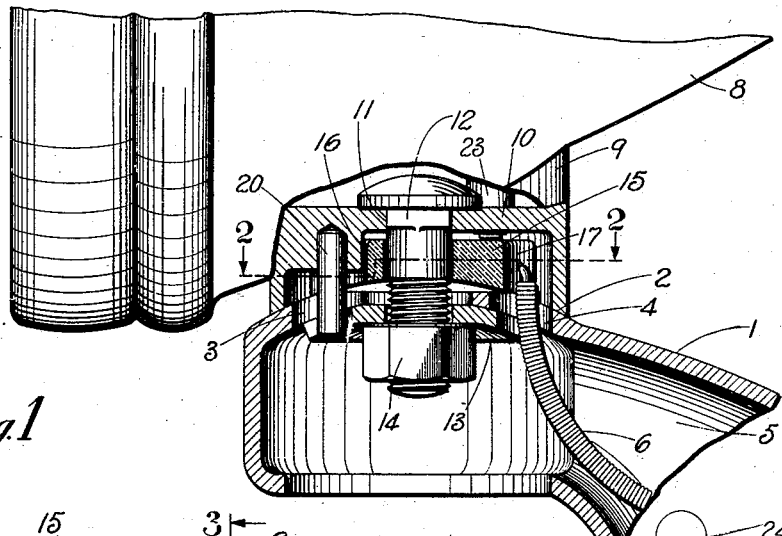
Fig.1
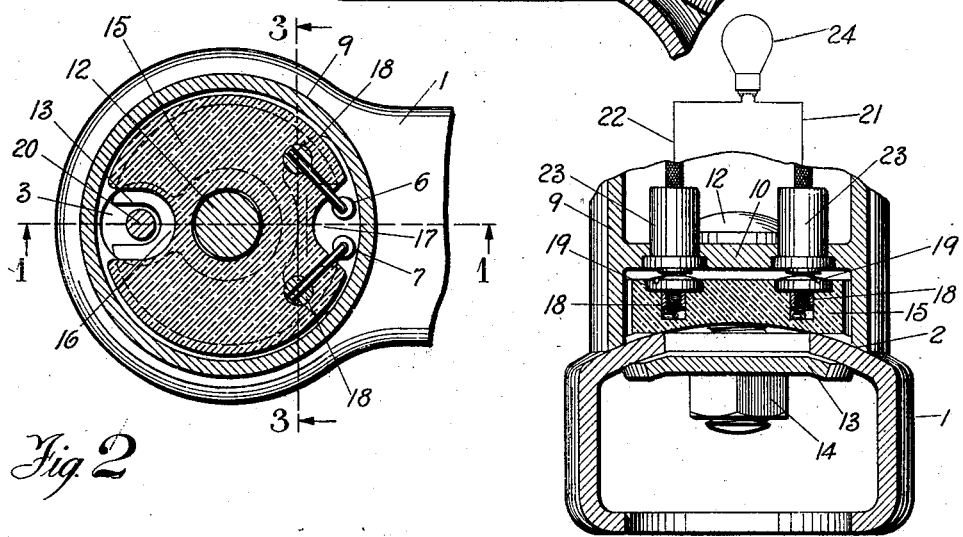
Fig.2                                              Fig.3
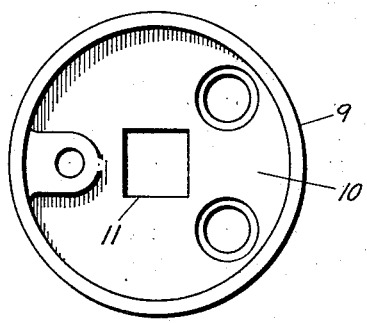
Fig.4
INVENTOR.
Karl M. Wise
BY
ATTORNEY Patented May 13, 1930

1,758,305

UNITED STATES PATENT OFFICE

KARL M. WISE, OF BUFFALO, NEW YORK, ASSIGNOR TO THE PIERCE-ARROW MOTOR CAR COMPANY, OF BUFFALO, NEW YORK, A CORPORATION OF NEW YORK

HEADLIGHT MOUNTING

Application filed May 23, 1929. Serial No. 365,329.

This invention relates to headlights and particularly to improvements in headlight mountings for motor vehicles.

One of the objects of the invention is to provide a headlight support including a coupling member which will permit the universal movement of the headlight on the supporting bracket and also permit the removal of the headlight from the bracket without necessitating the direct manual disconnection of the conductor wires.

Another object is to provide a headlight mounting including a connection for the conductor wires whereby the same are concealed from view, the mounting being constructed to permit the removal of the headlight from its support without necessitating the direct manual disconnection of the conductor wires.

Another object is to provide a hollow bracket supported by a motor vehicle in which conductor wires may be enclosed, a headlight universally mounted on the bracket, and a coupling which will permit the removal of the headlight from the bracket without necessitating the direct manual disconnection of the conductor wires.

The above and other objects relating to certain features of construction and combination of parts to be hereinafter described with reference to the accompanying drawing, and then claimed, will be apparent from the detailed description to follow.

In the accompanying drawing which illustrates a suitable embodiment of the present invention, Figure 1 is a vertical sectional view taken on the line 1—1 of Figure 2, showing a fragmentary portion of the headlight in elevation.

Figure 2 is a sectional view taken on the line 2—2 of Figure 1.

Figure 3 is a sectional view taken on the line 3—3 of Figure 2.

Figure 4 is a bottom plan view of the supporting member secured to the headlight.

Referring to the accompanying drawing in which like numerals refer to like parts throughout the several views, the supporting bracket 1 which may be attached to any suitable support such as the fender or a cross rod mounted on a motor vehicle, has a conical face 2 provided with openings 3 and 4 therein. The bracket 1 is preferably of a hollow construction to form a chamber 5 in which the conductor wires 6 and 7 may be enclosed.

A headlight 8 has a supporting member 9 depending therefrom, the lower edge face of the same being shaped to seat on the conical face 2 of bracket 1 whereby the headlamp may be adjustably mounted on the bracket by a means to be hereinafter described. The member 9 has a wall or partition 10 therein in which is formed an opening 11, preferably non-circular in shape, to non-rotatably receive the bolt 12, the bolt serving to secure the headlight on the bracket 1. A concave washer 13 conforming in shape to the portion 2 of the bracket 1 is interposed between the bracket 1 and the nut 14 on the bolt 12 whereby the bolt 12 will serve to lock the respective members in the desired position.

An insulating member 15 is mounted within the member 9 beneath the wall 10 and seats on the face 2 of the bracket 1, an opening 16 being formed therethrough in which the bolt 12 is suitably received. The insulating member 15 is preferably notched at 17 to provide a space for the conductor wires 6 and 7, the ends of the wires being suitably received in sockets 18 having terminals 19 projecting slightly above the top face of the member 15. A stud 20 secured in the wall 10 of the member 9 depends therefrom and extends through the opening 3 formed in the bracket 1 and through a notch formed in the washer 13. The stud 20 acts as a stop to control the amount of movement of the lamp 8 on the bracket 1 on which it is supported, the openings in the respective members permitting the lamp 8 to have sufficient universal movement on its support so that the lamp can be properly adjusted for all practical driving ranges of vision.

Conductor wires 21 and 22 are provided with terminals 23 secured in the wall 10 of the member 9 and extending slightly below the lower face thereof. The wires 21 and 22 lead to the lamp 24 mounted in the headlight 8 as is clearly shown in diagram in Figure 3. When the headlight is adjustably secured in position on the bracket 1 by means of the bolt 12 and the nut 14, the terminals 23 secured to the conductor wires 21 and 22 are adapted to contact with the terminals 19 connected with the conductor wires 6 and 7. It, of course, will be understood that the conductor wires 6 and 7 lead from a suitable source of electrical energy such as a storage battery (not shown) and that a suitable switch is positioned in the line to complete or break the electric circuit. As the means for wiring an electric headlight is so well known in the art and as this feature forms no part of my invention it is not thought that an illustration of this mechanism is necessary. It will be understood, however, that when the switch has been operated to close the electric circuit that because the terminals 23 are in contact with the terminals 19 that the lamp 24 will become effective.

As previously stated the conductor wires 6 and 7 are secured at their free ends in the sockets 18 formed in the member 15 and that the conductor wires 21 and 22 terminate in the terminals 23 secured in the wall 10 of the member 9. It will, therefore, be seen that when the nut 14 is backed off of the bolt 12 that the headlight 8 including the member 9 may be removed from the support 1 in which case no direct manual disconnection of the conductor wires is necessary. In other words the headlamp 8 may be lifted from its support without interfering in any way with the wire connections. Furthermore, it will be observed that the conductor wires 6 and 7 extend through the chamber 5 formed in the bracket 1 and that the conductor wires 21 and 22 are within the headlight casing 8 thus providing means for completely enclosing the wiring for the headlight and eliminating the possibility of short circuiting of the wires due to moisture which otherwise would tend to destroy the insulation on exposed wires.

While others have previously provided a mounting for a headlight so that the headlight could be universally mounted on its support, so far as I am aware no one has previously provided a universal mounting for a headlight which also permitted the mounting of the conductor wires in a manner so that the headlight could be disconnected or removed from its support without interfering with the wiring connections thus necessitating the direct manual disconnection of the wires.

Although the foregoing description is necessarily of a detailed character in order that the invention may be completely set forth, it is to be understood that the specific terminology is not intended to be restrictive or confining and that various re-arrangements of parts and modifications of structural details may be resorted to without departing from the scope or spirit of the invention as herein claimed.

What I claim is:

1. In a headlight mounting, the combination with a headlight supported by and having limited universal movement on a support, of conductor wires enclosed in said support, connector wires enclosed in said headlight, and means permitting the removal of said headlight from said support without necessitating the direct manual disconnection of said first named connector wires from said second named connector wires.

2. In a headlight mounting, the combination of a headlight supported by and having limited universal movement on a supporting bracket, of conductor wires enclosed in said support, said wires having terminals extending above said support, conductor wires enclosed in said headlight having terminals normally in contact with said first named terminals, and means permitting the removal of said headlight from said support without necessitating the direct manual disconnection of said first or second named terminals.

3. In a headlight mounting, the combination of a headlight supported by and having limited universal movement on a supporting bracket, of conductor wires enclosed in said bracket having terminals extending thereabove, conductor wires enclosed in said headlight having terminals normally in contact with but not secured to said first named terminals, and a bolt having a nut thereon for securing said headlight on said bracket, the removal of the nut from said bolt permitting the removal of said headlight from said bracket whereby the first and second named conductor wires will be disconnected.

4. In a headlight support, the combination of a hollow supporting bracket having a convex face, a headlight having a member depending therefrom seated on said convex face, means for securing said headlight on said bracket, said means permitting limited universal movement of said headlight on said bracket, an insulating member supported on said convex face, conductor wires enclosed in said hollow bracket having terminals extending from said insulating member, and conductor wires enclosed in said headlight having terminals normally in contact with said first terminals; said securing means permitting the removal of said headlight from said supporting bracket without necessitating the direct manual disconnection of the conductor wires.

Signed by me at Buffalo, New York, this 17th day of May, 1929.

KARL M. WISE.